Figure 1:
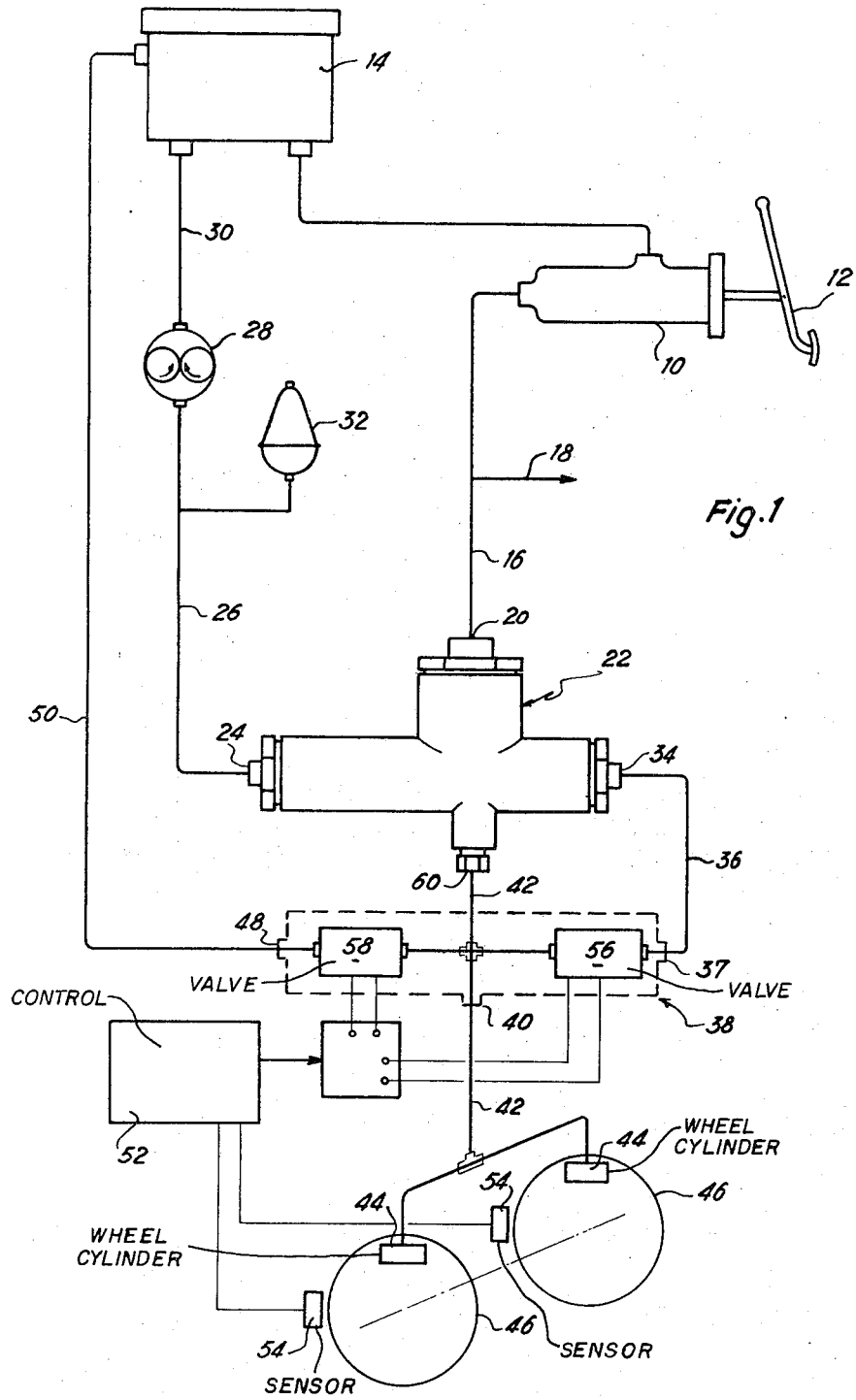

United States Patent [19]
Mangold

[11] 3,856,364
[45] Dec. 24, 1974

[54] VEHICLE ANTISKID BRAKING SYSTEM

[75] Inventor: James Mangold, Tremblay-les-Gonessethat, France

[73] Assignee: Societe Anonyme D.B.A.

[22] Filed: Oct. 21, 1971

[21] Appl. No.: 191,466

Related U.S. Application Data

[63] Continuation of Ser. No. 884,090, Dec. 11, 1969, abandoned.

[30] Foreign Application Priority Data
Dec. 27, 1968  France .............................. 68.181037

[52] U.S. Cl. ............. 303/21 F, 188/181 A, 303/10, 303/21 AF, 303/40
[51] Int. Cl. ............................................. B60t 8/06
[58] Field of Search ............ 303/21 F, 21 AF, 6, 24, 303/61–63, 68–69, 10, 40; 188/181; 244/111

[56] References Cited
UNITED STATES PATENTS

| | | |
|---|---|---|
| 2,459,665 | 1/1949 | Majneri .............................. 244/111 |
| 2,753,017 | 7/1956 | Curl et al. ........................... 303/21 F |
| 2,944,772 | 7/1960 | Armstrong et al. ................ 303/21 F |
| 3,124,220 | 3/1964 | Kell ................................... 188/181 A |
| 3,503,655 | 3/1970 | Heimler ............................. 303/21 F |
| 3,514,161 | 5/1970 | Frayer ............................... 303/21 F |

Primary Examiner—Duane A. Reger
Assistant Examiner—D. C. Butler
Attorney, Agent, or Firm—Ken C. Decker; William N. Antonis

[57] ABSTRACT

This invention relates to a vehicle antiskid braking system and in particular to a fluid pressure braking system including antiskid control assembly adapted to control the fluid braking pressure from a fluid pressure supply conduit to a set of vehicle wheel brake cylinders so as to prevent skidding of the corresponding braked wheels.

9 Claims, 2 Drawing Figures

VEHICLE ANTISKID BRAKING SYSTEM

This is a continuation of application Ser. No. 884,090, filed Dec. 11, 1969 now abandoned.

This invention relates to a vehicle antiskid braking system.

It has already been proposed, more particularly for the tractor-trailor type vehicles, to provide antiskid braking systems of the type comprising a control valve means operative, when actuated by a movable valve actuating member responsive to an input control force, to connect a high fluid pressure source to a fluid supply conduit and, an antiskid control valve unit operatively located between said supply conduit and an exhaust conduit leading to a relatively low fluid pressure reservoir for controlling the fluid braking pressure in an outlet fluid conduit leading to a set of wheel brake mechanisms as a function of the skidding of at least one corresponding braked wheel.

In such prior braking systems, the said movable valve actuating member was generally responsive to the differential between said input control force as controlled by the vehicle operator and a reaction force representative of the fluid pressure in said supply conduit, so that the fluid pressure to said antiskid valve unit substantially varies as a function of said input control force. However, when said antiskid unit merely consists of two valves controlling the fluid connections from said supply conduit to said outlet conduit and from the latter to the exhaust conduit respectively it has been noted that the supplying a non-constant relatively low fluid pressure to said antiskid valve unit raised many problems for obtaining an effective control of the outlet braking pressure in said outlet conduit and for thereby optimizing the time-delay response of the antiskid braking system.

The main object of the invention is to provide an antiskid braking system wherein the antiskid valve unit is automatically supplied with a relatively constant high fluid pressure from a source whenever it is actuated to modify the braking pressure to the wheel brake actuators for preventing the skidding of the corresponding braked wheel.

According to the main feature of the invention there is provided a vehicle antiskid braking system of the type defined hereinabove wherein said valve actuating member is further responsive to a reaction pressure force opposing said input control force and varying as a function of the fluid braking pressure in said outlet conduit and brake mechanisms.

Figure 2:
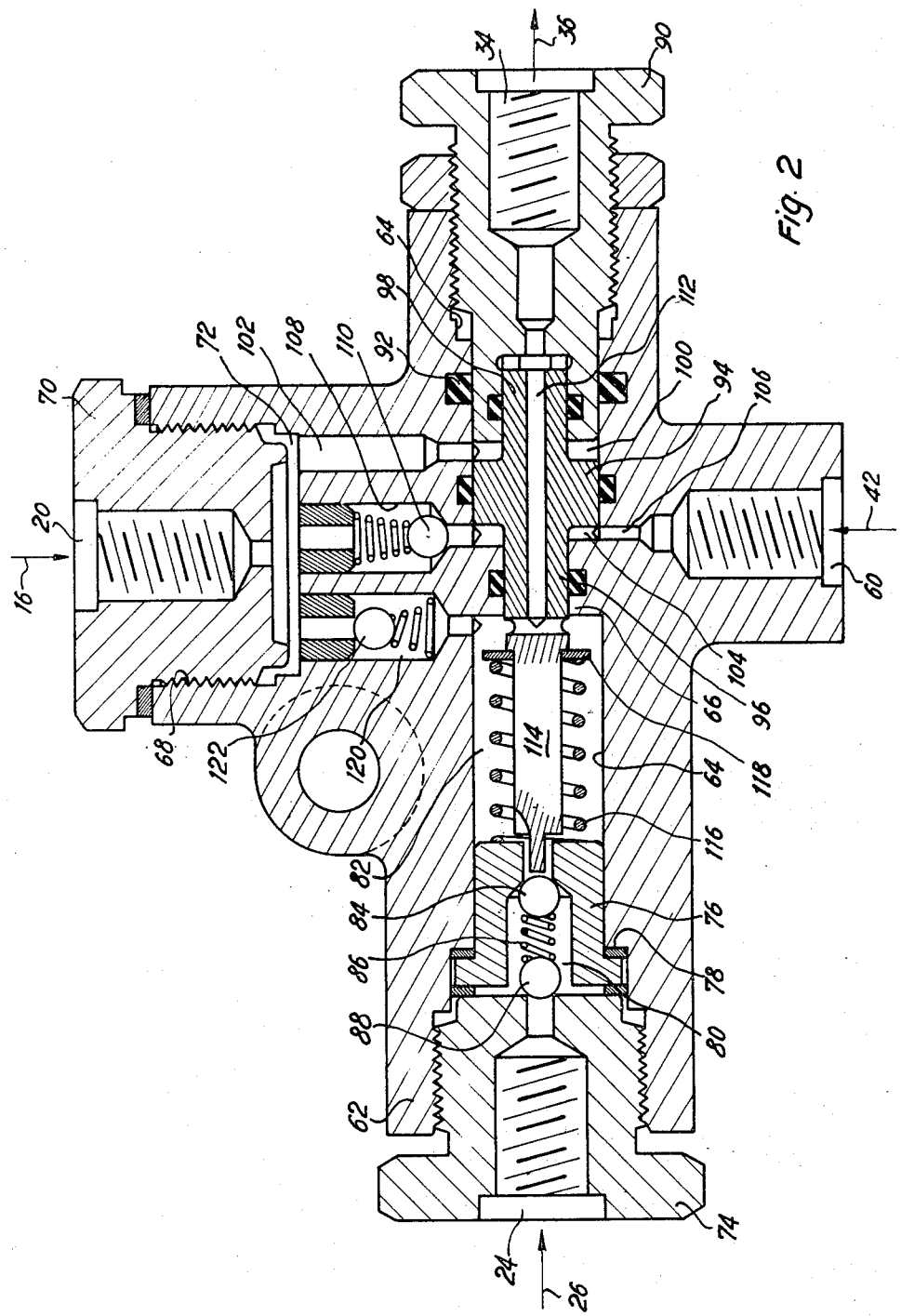

Other features and advantages of the invention will appear from the following description taken in connection with the accompanying drawings in which:

FIG. 1 is a diagrammatic view of a fluid braking system according to the invention, and FIG. 2 is a cross-sectional view of a preferred embodiment of the relay valve assembly shown in FIG. 1.

Referring to FIG. 1, reference numeral 10 designates a hydraulic pressure control means such as a hydraulic master cylinder actuated by an operator operated brake pedal 12 to pressurize hydraulic fluid from a hydraulic reservoir 14 to a main outlet conduit 16 leading to one set of wheel brake cylinders (not shown) relating to the front axle wheels for instance through a conduit 18 and to the input 20 of a control valve 22. Relay valve 22 is provided with an inlet supply 24 connected by a fluid conduit 26 to the discharge side of a high fluid pressure source such as an engine driven hydraulic pump 28 connected by a conduit 30 to the reservoir 14. A hydraulic accumulator 32 may be advantageously branched on supply conduit 26. Relay valve 22 is further provided with an output 34 connected by a fluid braking pressure supply conduit 36 to the input 37 of an antiskid valve unit 38 having an output 40 connected by means of an outlet conduit 42 to a set of wheel brake mechanisms 44 relating to the rear axle wheels 46 and an exhaust 48 connected to reservoir 14 by an exhaust conduit 50. The valve unit 38 is controlled by any known suitable antiskid control device 52 responsive to the angular velocity and/or deceleration of at least one of the braked wheels 46 as sensed for instance by any known sensing means 54 relating to each vehicle wheel 46. In the shown embodiment, the antiskid valve unit 38 is of a so-called "hit-or miss" governor type, viz of the type adapted upon actuation by control 52 to trigger from its normal or connecting position in which the outlet conduit 42 is connected to supply conduit 26 to its exhausting or releasing position in which the outlet conduit 42 is connected to the exhaust conduit 50 leading to the reservoir so as to decrease the fluid braking pressure in the brake mechanisms 44 upon skidding of the corresponding wheels 46 and then to be repositionned in its normal conducting position whenever the wheels have substantially reached again their normal angular velocity so as to allow the fluid braking pressure from supply conduit 36 to supply the brake mechanisms 44. In the shown embodiment valve unit 38 is comprised of a insulating or shut-off valve 56 and of a detent or exhaust valve 58 which are simultaneously actuated by any known actuating means such as solenoids (not shown) electrically controlled by device 52 for instance to realize the various connections explained hereinabove. For purpose which will appear hereinafter, the outlet conduit 42 is connected to a return or control orifice 60 provided in relay valve 22.

Referring now to FIG. 2 illustrating a preferred embodiment of the relay valve 22 diagrammatically shown in FIG. 1, the casing 62 of valve 22 mainly comprises an axial bore 64 having a partition wall 66 therein and an inlet bore 68. Bore 68 is scalingly closed by a plug 70 defining therein an inlet chamber 72 connected to inlet orifice 20 provided in plug 70. Axial bore 64 is closed at its left end, as seen in FIG. 2, by a plug 74 with an annular valve seat 76 sealingly secured between plug 74 and an annular shoulder 78 provided in bore 64 so as to define a supply chamber 80 between supply orifice 24 in plug 74 and the valve seat member 76 and an output chamber 82 between the latter and the partition wall 66. The central passage of the valve seat 76 connecting supply and output chambers 80 and 82 is controlled by a ball valve member 84 normally urged in sealing engagement with valve seat 76 by a compression spring 86 which advantageously takes abutment on a check valve member 88 operative to prevent fluid flow from the supply chamber 50 to the supply orifice 24. The right end of axial bore 64 is closed by a hollow plug 90 adjustably secured by any known suitable means in bore 64, an annular seal 92 being provided to warrant the fluid tightness of the adjustable connection between plug 90 and bore 62.

A movable piston member 94 having two opposed cylindrical projections 96 and 98 of substantially equal diameter is sealingly mounted within bore 64 with the two projections 96 and 98 sealingly slidable within the respective central passages in partition wall 66 and hollow plug 90 respectively so as to define an inlet chamber 100 connected by a radial passage 102 to chamber 72 and a control chamber 104 connected to return orifice 60 by a radial passage 106 and to inlet chamber 72 by a return passage 108 including a one way ball valve 110 allowing fluid flow from chamber 104 to chamber 72. Piston 94 is provided with a central passage 112 connecting chamber 82 and orifice 34 provided in plug 90, such passage further permitting to balance piston 94 with respect to the pressure in chamber 82. Projection 96 of piston 94 extends into chamber 82 so as to define a valve actuating plunger 114 operative to open the normally closed valve 86 when piston 94 is urged toward the left, as seen in FIG. 2, against the force of a return spring 116 compressed between valve seat 76 and a spring retainer 118 affixed to plunger 114 for normally urging piston 94 in engagement with plug 90. Inlet chamber 72 is connected to output chamber 82 by a radial passage 120 including a non return valve 122 adapted to prevent fluid flow from the output chamber 82 to the inlet chamber 72.

The braking system and relay valve described hereinabove with reference to FIGS. 1 and 2 of the drawings operates as follows:

Upon actuation of the brake control pedal 12, fluid under pressure from the master cylinder 10 supplies front brake mechanisms (not shown) via fluid conduits 16 and 18 as well as inlet chambers 72 and 100 of relay valve 22. The pressure in chamber 100 urges piston 94 toward the left, as seen in FIG. 2, away from the abutting plug 90 so as to urge plunger 114 to open valve 84 against the load of spring 116. The high fluid pressure supplying chamber 80 through the valve 88 from source 28, 32 reaches output chamber 82, and thus the brake mechanisms 44 through outlet conduit 42, passage 112 supply conduit 36 and normally open valve 56, the exhaust valve 58 remaining in its normally closed position. From outlet conduit 42 fluid under pressure supplies control chamber 104 so as to urge piston 94 toward plug 90 to close valve 84 as soon as the outlet braking pressure in conduit 42 is substantially equal to inlet control pressure from master cylinder 10, with the load of return spring 116 being considered as negligible. In the event of a skidding of at least one of the braked wheels 46, antiskid control 52 is operative to close shut-off valve 56 and to substantially simultaneously open the exhaust valve 58, that resulting in a substantial decrease of fluid pressure in conduit 42 which is thus connected to low pressure reservoir 14. Such a pressure decrease which obviously permits the wheels 46 to be driven again in rotation, causes displacement of piston 94 toward the left as seen in FIG. 2 to open valve 84 so that high pressure fluid is available at the inlet 37 of the antiskid control valve unit 38 before the latter is triggered by control device 52 to its normal position for communicating output 40 and outlet conduit 42 with inlet 37 connected to the high pressure source 28 through conduit 36, passage 112 and output chamber 82. Upon brake releasing operation passage 108 and valve 110 allows return fluid flow from brake mechanisms 44 to the master cylinder 10 and the reservoir 14 through chamber 104.

In the event of a failure in the high pressure source 28 or in conduit 26, passage 120 and non-return valve 122 allows emergency fluid flow from master cylinder 10 to brake mechanisms 44 through chamber 82, passage 112 and conduits 36, and 42, the check valve 88 preventing any fluid flow from chamber 82 to the conduit 26. It is to be noted that by suitably setting the respective loads of spring 116 and of the spring acting on non-return valve 122, it may be realized a control relay valve which upon braking operation, permits normal fluid flow from the master cylinder 10 to the brake mechanisms 44 and which is operative to supply the latter with fluid pressure from high pressure source as soon as the antiskid unit 52-38 is actuated for modifying the outlet fluid pressure in the brake mechanism 46 for preventing skidding of the braked wheels as it will be easily understood by anyone skilled in the art. Thus with the above arrangement, the power source may be of any simple and cheap design since the response and discharge characteristics thereof are not required to be very high and accurate.

From the above it will be clearly understood that, upon skidding of the braked wheels causing a controlled actuation or triggering of the valve unit 38 by the antiskid control device 52 the relay valve is moved in the position connecting the high pressure source to the input 37 of the valve unit 38 whenever the shut off valve 56 is positioned in its closed position and the exhaust valve in its open exhaust position for connecting conduit 42 with the reservoir 14. In other words the control actuation of valve actuation piston 94 by the pressure differential between the control inlet pressure from the master cylinder and the braking outlet pressure downstream from the antiskid control valve unit 38 permits first to actuate the relay valve whenever the braking pressure supply conduit 36 is disconnected with the output conduit 42 and then to directly supply the input 37 of the antiskid valve unit 38 with a high fluid pressure as song as the braking pressure in conduit 42 is not substantially equal to the control pressure in the master cylinder. Such a relay-valve operation permits to substantially reduce the time delay for building up the fluid braking pressure to the brake mechanisms since it is not required to take account of the relative inertias of the various movable valve elements and of the friction forces opposing control displacements thereof. Furthermore, due to the wide opening of valve 84, there is no substantial pressure drop across valve 22 so that a supply of unrestricted high pressure fluid flow is available at the input 37 of the valve unit 38.

It is also to be noted that the valve actuating piston may be of stepped design so as to proportion the braking pressure in the set of brake mechanisms 44 to the pressure from the master cylinder 10. Furthermore the relay valve 22 may be located upstream from the rear front wheels brake mechanisms with the rear wheel brake mechanisms connected to conduit 18.

In the above braking circuit, it will also be understood that the antiskid valve unit 52-38 of the shown embodiment could be replaced by any known suitable antiskid control unit, such as an antiskid assembly of the so called proportional type, operatively located between the fluid supply conduit 36 and the exhaust conduit 50 so as to control the fluid braking outlet pressure as a function of the skidding of the braked wheels. In the event there is provided a proportional type antiskid unit which for instance may comprise an exhaust valve adapted to control the fluid flow from an outlet chamber operatively connected to the supply conduit to the exhaust conduit so as to control the fluid pressure in this outlet chamber and outlet conduit connected thereto, it is to be noted that the inlet of the antiskid unit is directly connected to the relatively constant high pressure from the source as soon as this unit has been actuated to modify the outlet pressure for preventing the skidding of the braked wheels.

It results from the supplying the unit with a regulated high pressure that the valve structure of the antiskid unit will be of a simple design, reliable in operation and cheap to manufacture.

What we claim is:

1. In a vehicle antiskid braking system:
a fluid pressure source;
a fluid reservoir;
an antiskid control device including electrically operated valve means for controlling fluid communication between the brakes of the vehicle and the fluid pressure source and between the brakes of the vehicle and the fluid reservoir;
operator-operated fluid pressure generating means for operating the brakes of the vehicle; and
a relay control device for controlling fluid communication between the pressure source and the antiskid control device in response to operation of said operator-operated means;
said relay control device including a housing defining a bore therewithin; a first port communicating said bore with said pressure source, a second port communicating said bore with the inlet of the antiskid control device, a third port communicated with the operator-operated means, a fourth port communicated with the fluid pressure level communicated to the brakes of the vehicle, and valve means responsive to the fluid pressure level at said third port for initiating fluid communication between the first and second ports upon actuation of said operator-operated means, said valve means being further responsive to the fluid pressure level at said fourth port to terminate fluid communication between the first and second ports when the pressure level in the brakes of the vehicle attains a predetermined level, said valve means opening to again permit fluid communication between the first and second ports if the pressure level at said fourth port drops below said predetermined level upon actuation of said antiskid control device, said predetermined level being proportional to the fluid pressure level developed in the operator-operated means.

2. The invention of claim 1: and
a piston slidably mounted in said bore and operatively connected to said valve means for operating the latter;
said piston cooperating with the wall of the bore to define a first chamber between one face of the piston and the wall of the bore and a second chamber between the other face of the piston and the wall of the bore;
one of said chambers being communicated to said third port;
the other of said chambers being communicated with said fourth port.

3. The invention of claim 2:
passage means within said housing communicating said other chamber with said third port; and
check valve means within said passage means to permit flow of fluid from the other chamber to the third port when the pressure level developed at the latter is less than the pressure level developed at said fourth port, but preventing flow of fluid in the reverse direction.

4. The invention of claim 2:
passage means within said housing communicating said second port with the third port; and
check valve means within said passage means to permit fluid communication to the antiskid valve when a malfunction prevents communication of fluid from the pressure source to said inlet, said last-mentioned check valve means preventing flow of fluid from the second port to the third port when the pressure level at the second port is higher than the pressure level developed at said third port.

5. The invention of claim 2:
said valve means including check valve means to prevent flow of fluid from the second port to the first port when a malfunction prevents fluid communication from said pressure source to the first port.

6. In a vehicle antiskid braking system:
a fluid pressure source;
a fluid reservoir;
an antiskid control device including electrically operated valve means for controlling fluid communication between the brakes of the vehicle and the fluid pressure source and between the brakes of the vehicle and the fluid reservoir;
operator-operated fluid pressure generating means for operating the brakes of the vehicle;
a relay control device for controlling fluid communication between the pressure source and the antiskid control device in response to operation of said operator-operated means;
said relay control device including a housing defining a bore therewithin, an inlet communicating said bore with said pressure source, an outlet communicating said bore with the inlet of the antiskid control device, and valve means responsive to actuation of the operator-operated means for initiating fluid communication between the inlet and the outlet, said valve means being further responsive to the fluid pressure level developed in the brakes of the vehicle to terminate fluid communication between the inlet and outlet when the pressure level in the brakes of the vehicle attains a predetermined level, said valve means opening to again permit fluid communication between the inlet and the outlet if the pressure level in the brakes of the vehicle drops below said predetermined level, said predetermined level being proportional to the fluid pressure level developed in the operator-operated means, and
a piston slidably mounted in said bore and operatively connected to said valve means for operating the latter;
said piston cooperating with the wall of the bore to define a first chamber between one face of the piston and the wall of the bore and a second chamber between the other face of the piston and the wall of the bore;
one of said chambers being communicated to said operator-operated means;
the other of said chambers being communicated with the fluid pressure developed in the brakes of the vehicle.

7. The invention of claim 6:

passage means within said housing communicating said other chamber with said operator-operated means; and check valve means within said passage means to permit flow of fluid from the other chamber to the operator-operated means when the pressure level developed in the latter is less than the pressure level developed in the brakes of the vehicle, but preventing flow of fluid in the reverse direction.

8. The invention of claim 6:

second passage means within said housing communicating said outlet port with the operator-operated means; and check valve means within said second passage means to permit fluid communication to the antiskid valve when a malfunction prevents communication of fluid from the pressure source to said inlet, said last-mentioned check valve means preventing flow of fluid from the outlet to the operator-operated means when the pressure level at the outlet is higher than the pressure level developed in the operator-operated means.

9. The invention of claim 6:

said valve means including check valve means to prevent flow of fluid from the base through the inlet when a malfunction prevents fluid communication from said pressure source to the inlet.

* * * * *